(12) United States Patent
Jeong

(10) Patent No.: US 7,245,591 B2
(45) Date of Patent: Jul. 17, 2007

(54) DATA TRANSLATION APPARATUS OF ATM IN MOBILE COMMUNICATION SYSTEM

(75) Inventor: Chang-Rae Jeong, Seoul (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 1032 days.

(21) Appl. No.: 10/265,374

(22) Filed: Oct. 7, 2002

(65) Prior Publication Data
US 2003/0081622 A1    May 1, 2003

(30) Foreign Application Priority Data
Oct. 29, 2001  (KR) .............................. 2001-66901

(51) Int. Cl.
*H04L 12/28* (2006.01)
(52) U.S. Cl. .................. 370/310.1; 370/466; 370/469; 370/395.6; 370/395.51
(58) Field of Classification Search ................ 370/401, 370/310, 315, 353, 358, 360, 395, 400, 466, 370/467, 468, 535, 905, 916, 389, 310.1, 370/469, 395.6, 395.61
See application file for complete search history.

(56) References Cited
U.S. PATENT DOCUMENTS
5,936,949 A * 8/1999 Pasternak et al. ........... 370/328
6,018,521 A * 1/2000 Timbs et al. ................. 370/342
6,646,983 B1 * 11/2003 Roy et al. .................... 370/218

* cited by examiner

Primary Examiner—Wing Chan
Assistant Examiner—Wutchung Chu
(74) Attorney, Agent, or Firm—Robert E. Bushnell, Esq.

(57) ABSTRACT

A data translation apparatus is between a base station using an Internet protocol (IP) and a cell controller using an asynchronous transfer mode (ATM) data in a mobile communication system. The apparatus includes a plurality of line interface devices for performing a data connection with the cell controller, a physical layer processor for performing a physical layer process on a data received through the line interface device, a universal test and operations physical layer protocol interface for ATM (UTOPIA) switch for performing a switching process for translating and transmitting ATM data received from a cell controller and data received from an IP base station, a data translator for translating data to be transmitted to the UTOPIA switch into asynchronous transfer mode adaptation layer 0 (AAL0) data, and for translating data to be transmitted to the IP base station into Ethernet data, a plurality of repeaters for transceiving data between the IP base station and the data translator, a UTOPIA mapper for performing a UTOPIA interface on the data from the UTOPIA switch, a layer converter for converting the data from the UTOPIA interface to AAL0 layer or AAL2 layer data, and a controller for controlling operations of the layer converter, the UTOPIA mapper, and the UTOPIA switch.

14 Claims, 2 Drawing Sheets

DATA TRANSLATION APPARATUS OF ATM IN MOBILE COMMUNICATION SYSTEM

CLAIM OF PRIORITY

This application makes reference to, incorporates the same herein, and claims all benefits accruing under 35 U.S.C. §119 from an application for Data Translation Apparatus of ATM in Mobile Communication earlier filed in the Korean Industrial Property Office on Oct. 29, 2001, and thereby duly assigned Serial No. 2001-66901.

BACKGROUND OF THE INVENTION

1. Field of the Invention

The present invention relates generally to a data translation apparatus in a mobile communication system, and more particularly, to a data translation apparatus of asynchronous transfer mode (ATM).

2. Description of the Related Art

Recently, as the transmission of traffic information, for example, voice and data, is getting faster in public land mobile network (PLMN), ATM data is being recommended for faster data transmission in IS-95C systems based on a code division multiple access (CDMA) method. IS-95C is one of the digital-based cellular standards of the Telecommunications Industry Association/Electronic Industries Association (TIA/EIA) Interim Standard IS-95series (IS-95A, IS-95B and IS-95C) (also known as CDMA2000) entitled *Mobile Station—Base Station Compatibility Standard for Dual-Mode Wideband Spread Spectrum Cellular System*. Such a trend is now found in a mobile switching center (MSC), a base station controller (BSC), and even a base transceiver subsystem (BTS, also called base station transceiver subsystem). Besides, the transmission method in the PLMN is being changed similar to all Internet protocol (IP). In case of the CDMA system, although a systematic scheme concerning the all IP network in $3^{rd}$ generation partnership project (3GPP) or $3^{rd}$ generation partnership project 2 (3GPP2) is getting into shape, it will still take a while before it is actually put to practical use. Right now, it is only being realized as a proprietary protocol in a particular section.

As described above, the signal and information path among the MSC, the BSC and the BTS is mainly on the basis of the ATM method (in case of a physical layer protocol (PHY), E1 (European digital line interface) is usually used). A configuration of MSC and BSC combined system can be formed over an IP network between systems. The IP network is now explained. First of all, a base station is connected to terminals through antennas via a wireless link. Also, the base station is connected to a cell controller through an ATM-E1 (asynchronous transfer mode-European digital line interface) link. Therefore, the base station and the cell controller take an H/W (hardware) shape or the program itself is designed to be able to process the ATM data. Here, the cell controller is connected to an access G/W and an air agent through an IP network to a call agent and a media G/W. In this manner, the cell controller is connected to the public switched telephone network (PSTN) at its end.

Especially when the BTS is changed to the IP connection as described above, the H/W shape of the BSC or the program should be designed again, but unfortunately when doing so, a lot of problems have been discovered. That is to say, to accomplish a more stabilized operation between the BTS and the BSC, a number of systems' performance should be tested, and if in any case there is a problem, H/W (hardware) or S/W (software or program) necessary to the systems should be redesigned and the stabilization test should be conducted again. This naturally required a lot of human resources and time, and of course additional costs thereby. Primarily, it is that way because the IP and the ATM use completely different techniques from each other, and changing one single component cannot just solve all problems.

SUMMARY OF THE INVENTION

It is, therefore, an object of the present invention to provide a data translation apparatus of asynchronous transfer mode (ATM) in a mobile communication system, that is, an interfacing apparatus between IP-BTS (Internet protocol—Base transceiver subsystem) and ATM-BSC (Asynchronous transfer mode—Base station controller).

To achieve the above and other objects, there is provided a data translation apparatus between a base station using an Internet protocol (IP) and a cell controller using an asynchronous transfer mode (ATM) data in a mobile communication system, the apparatus including: a plurality of line interface devices for performing a data connection with the cell controller (base station controller); a physical layer processor for performing a physical layer process on a data received through the line interface device; a universal test and operations physical layer protocol interface for ATM (UTOPIA) switch for performing a switching process for translating and transmitting ATM data received from a cell controller and data received from an IP base station; a data translator for translating data to be transmitted to the UTOPIA switch into asynchronous transfer mode adaptation layer 0 (AAL0) data, and for translating data to be transmitted to the IP base station into Ethernet data; a plurality of repeaters for transceiving data between the IP base station and the data translator; a UTOPIA mapper for performing a UTOPIA interface on the data from the UTOPIA switch; a layer converter for converting the data from the UTOPIA interface to AAL0 layer or AAL2 layer data; and a controller for controlling operations of the layer converter, the UTOPIA mapper, and the UTOPIA switch.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
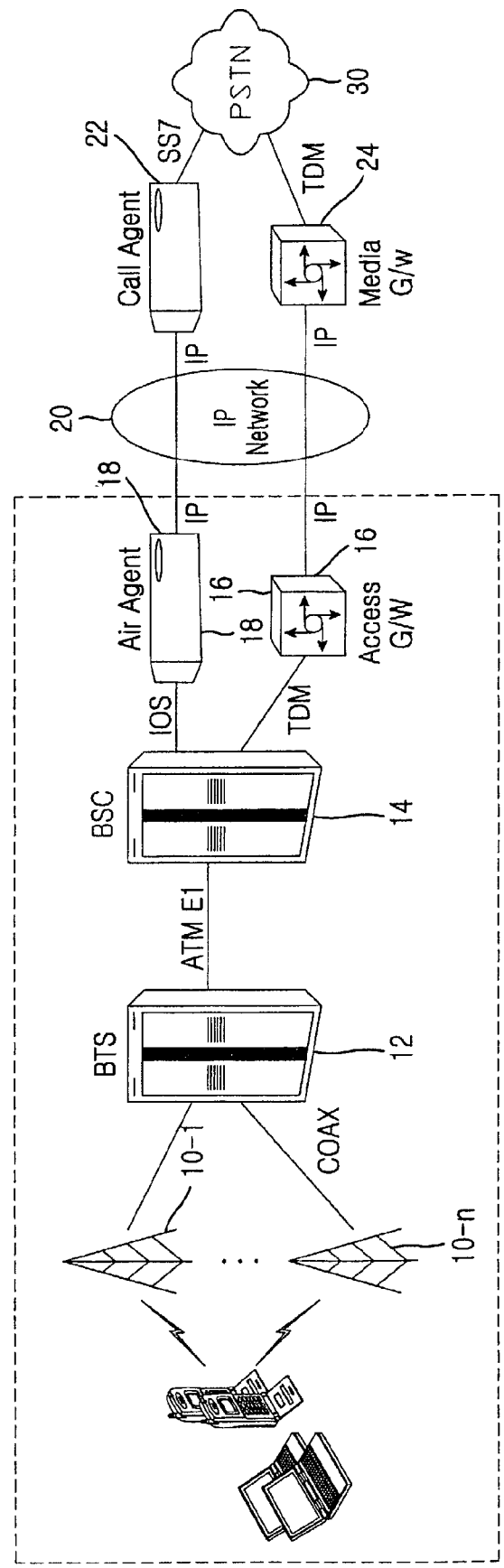
FIG. 1 diagrammatically shows a configuration of MSC and BSC combined system, which can be formed over IP network between systems.

Turning now to the drawings, the signal and information path among the MSC, the BSC and the BTS is mainly on the basis of the ATM method (in case of a physical layer protocol (PHY), E1 is usually used). FIG. 1 diagrammatically shows a configuration of MSC and BSC combined system, which can be formed over an IP network between systems. The IP network is now explained with reference to FIG. 1. First of all, a base station 12 is connected to terminals through antennas 10-1, . . . , and 10-n via a wireless link. Also, the base station 12 is connected to a cell controller 14 through an ATM-E1 link. Therefore, the base station 12 and the cell controller 14 take an H/W shape or the program itself is designed to be able to process the ATM data. Here, the cell controller 14 is connected to an access G/W 16 and an air agent 18 and through an IP network 20 to a call agent 22 and a media G/W 24. In this manner, the cell controller 14 is connected to the public switched telephone network (PSTN) 30 at its end.

A preferred embodiment of the present invention will be described herein below with reference to the accompanying drawings. In the following description, well-known functions or constructions are not described in detail since they would obscure the invention in unnecessary detail.

Figure 2:
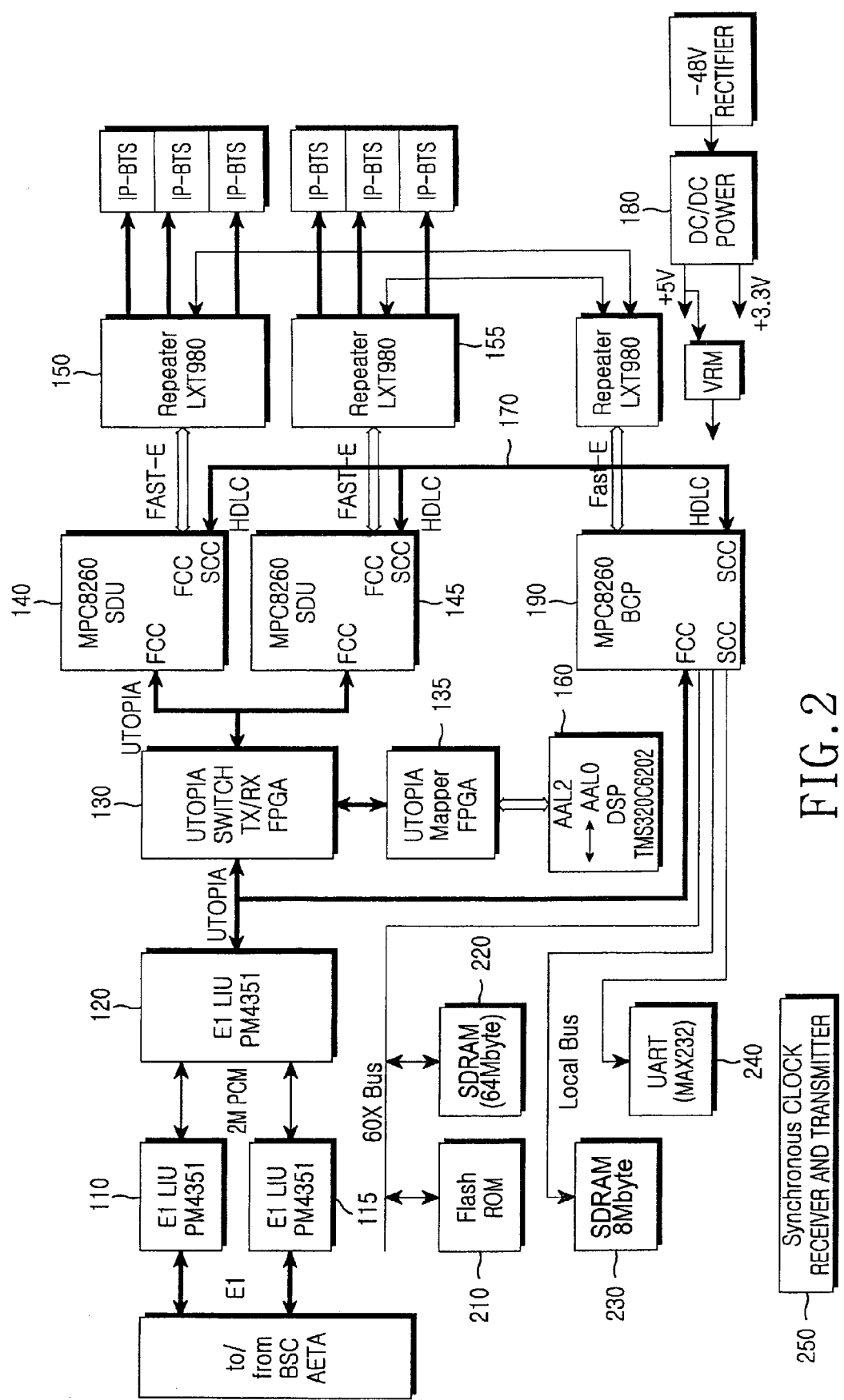
FIG. 2 is a block diagram of a data interface apparatus between IP-BTS and ATM-BSC in accordance with a preferred embodiment of the present invention.

FIG. 2 is a block diagram of a data interface apparatus between IP-BTS (Internet protocol—Base transceiver subsystem, also called Internet protocol—Base station transceiver subsystem) and ATM-BSC (Asynchronous transfer mode—Base station controller) in accordance with a preferred embodiment of the present invention. The configuration and operation of the data interface apparatus according to the present invention will be now explained with reference to FIG. 2.

A line interface unit 110 and 115 is a board for interfacing an AETA board (by AETA) and E1 inside of the BSC which supports ATM-E1. The line interface unit 110 and 115 is configured in such a manner that one PM4351 (by PMC-SIERRA) supports one E1 line. Specific part numbers are mentioned only to show examples. In an ATM physical layer processor 120, each E1 line is supported by an individual device. The ATM physical processor 120 demuxes the PCM (pulse code modulation) data, a muxed data of 2 [MHz] E1 received from the line interface units 110 and 115, to ATM data and outputs the demuxed ATM data. This procedure is called cell mapping. In addition, the ATM physical processor 120 performs the cell mapping in reverse order as well. A UTOPIA (Universal Test and Operations Physical Interface for ATM) switch 130 can be configured with a field programmable gate array (FPGA), and does a simple ATM switching between the BSC end and the IP-BTS.

A UTOPIA mapper 135 carries out an interface function for operating a layer converter 160 since the layer converter 160 does not have the UTOPIA interface. Similar to the UTOPIA switch 130, the UTOPIA mapper 135 can be configured with the FPGA. Normally, in the conventional CDMA-2000 system, the traffic information was taken out of the data in the AAL2 layer for a more efficient traffic management between the BSC and the BTS. For the similar reason, the present invention also used the data from the AAL2 layer as the traffic information. Therefore, the layer converter 160 is actually like a processor, trying to do the data translation between the data in the AAL2 layer (ATM adaptation layer (2 being the layer of the ATM communication system architecture)) and the data in the AAL0 layer (ATM adaptation layer (0 being the layer of the ATM communication system architecture)or also called absolute assembly language 0 layer). This can be accomplished using a directory system protocol (DSP) (TMS320C6202:TI). On the other hand, data translators 140 and 145 transceive data with the UTOPIA switch 130 and the UTOPIA level, and translates the AAL0 signal transmitted from the UTOPIA switch 130 to an ethernet signal and transports the ethernet signal to the IP-BTS. At this time, for example a fast ethernet (signaling rate of 100 Megabits per second) can be used as the line connected to the data translators 140 and 145. Also, the data translators 140 and 145 are preferably multimedia personal computer (MPC) 8260 of a MOTOROLA system.

One repeater 150 and 155 is connected to one data processor 140 and 145. Usually, the repeaters 150 and 155 receive data to the physical layer chip of the fast ethernet, where a fast ethernet PHY chip, using level one, LXT980 by INTEL for example, can utilize four channel repeaters. In short, a plurality of IP-BTS can be connected to one repeater, and the connection at this times means a physical connection.

In the meantime, the data translator 140 and 145 and a controller 190 form a pass for doing an inter processor communication (IPC) over the ethernet. Furthermore, the controller 190 is like a processor responsible of controlling the entire module, for example, the drive and operation control of each FPGA, the layer converter control, the data translators 140 and 145 control, and the communication control between the BSC and the IPC. Further, the controller 190 has memories called flash memory 210 and synchronous dynamic random access memory (SDRAM) 220. These memories store a temporary data that is sometimes generated in the middle of the operation as well as other program data to be operated in accordance with the present invention. Another memory called SDRAM 230, is a local bus memory of the controller 190 to do the UTOPIA service. Namely, the SDRAM 230 buffers the data transmitted to the local bus.

An external connection unit 240 (i.e., UART: Universal Asynchronous Receiver Transmitter) interfaces the controller 190 and a specific external device, such as, an operator computer or a work station. A preferably used external connection unit is RS-232C port (Recommended Standard-232C standard interface approved by the Electronic Industries Association (EIA) for connecting serial devices, also called a serial port). Further, to adjust the synchronization of the device according to the present invention, the external connection unit 240 includes a synchronous clock receiver/transmitter 250 for generating clock signals. Since the synchronous clock receiver/transmitter (receiver and transmitter) is an essential component for every synchronizing device, more details would not be necessary here. Also, no specific details on the power supply's configuration (the reference numeral number 180 in FIG. 2) would be provided.

The following explains the operation procedure of the present invention. First of all, the traffic information received through the IP-BTS is translated to a signal for the AAL0 layer by the data translators 140 and 145. The translated information is then transmitted from the UTOPIA switch 130 to the layer converter 160 via the UTOPIA mapper 135. The layer converter 160 converts the AAL0 layer data received to the AAL2 layer data, and transfers the translated data to the UTOPIA mapper 135. The UTOPIA mapper 135 transfers the translated data for the AAL2 layer to the UTOPIA switch 130. In this manner, the IP data is translated to the AAL2 layer data of the ATM layer. Once the data is translated through this procedure, it is again translated to the physical layer data by the physical layer processor 120, and is transmitted to the cell controller through the line interface units 110 and 115. In fact, a very similar operation is performed in the cell controller. Thus, after the AAL2 layer data is translated to the AAL0 layer data, the AAL0 layer data is again changed to voice (PCM: pulse code modulation) through a direction system protocol (DSP) which is operated by a vocoder, and is transmitted later to the MSC or other BSC. So far, how to transmit the data from a base station to a cell controller has been explained. Data transmission from a cell controller to a base station can be achieved by taking the same procedure but in reverse order.

Meanwhile, the data translation apparatus shown in FIG. 2 in accordance with the present invention does the inter processor communication (IPC) with the IP-BTS. To explain further, the IPC signal transferred to the AAL5 (ATM adaptation layer 5) or the AAL0 (ATM adaptation layer 0) is inputted into the UTOPIA switch 130, going through the repeaters 150 and 155 and the data translators 140 and 145. Here, the UTOPIA switch 130 directly transmits the information corresponding to the received data to the controller 190 through the UTOPIA interface. In this manner, the inter processor communication between the IP-BTS and the data translator is accomplished. Also, the data translating procedure between the data translator and the IP-BTS can be achieved by taking the same procedure but in reverse order.

Now, the IPC operations inside of the data translator are explained. At first, the controller 190 and the physical layer processor 120 do the inter process communication with the controller 190 through the first-in-first-out (FIFO) buffer (not shown in FIG. 2). Similarly, the controller and the layer converter 160 do the inter process communication through the FIFO buffer. On the other hand, the data translators 140 and 145 and the controller 190 do the inter process communication based on the high level data link control (HDLC) method using the internal SCC (serial communication controller). The ethernet method can also be employed to transceive data through the communication line 170.

The UTOPIA switch 130 is the internally designed FPGA for supporting UTOPIA level 2. Accordingly, the direction from the physical layer processor 120 to the data translators 140 and 145 is called demuxed "UsTx" with the 3×8 port format. The FPGA in the UTOPIA switch 130 analyzes a virtual path identifier (VPI) and a virtual channel identifier (VCI) inside and transfer them to a corresponding path. Because the transmission speed towards the data translators 140 and 145 is very high, when transmitting the data, a separate queue is needed to control the data transmission.

In conclusion, the interfacing apparatus between the IP and the ATM for interworking the IP-BTS with the conventional BSC enables to use the BSC which translates the ATM level data without modifying the BSC, and saves a great deal of time investment on the system development and the system stabilization.

While the invention has been shown and described with reference to a certain preferred embodiment thereof, it will be understood by those skilled in the art that various changes in form and details maybe made therein without departing from the spirit and scope of the invention as defined by the appended claims.

What is claimed is:

1. A data translation apparatus between a base station using an Internet protocol and a cell controller using an asynchronous transfer mode data in a mobile communication system, the apparatus comprising:
   a plurality of line interface units performing a data connection with said cell controller using asynchronous transfer mode data;
   a physical layer processor receiving data from said line interface unit and performing cell mapping on data received from said line interface unit;
   a universal test and operations physical layer protocol interface for asynchronous transfer mode (UTOPIA) switch connected to said physical layer processor, for performing a switching process for transmitting data between a base station controller and a base station;
   a data translator for translating data to be transmitted to said UTOPIA switch into asynchronous transfer mode adaptation layer 0 data, and for translating data to be transmitted to said Internet protocol base station into Ethernet data;
   a plurality of repeaters for transceiving data between said Internet protocol base station and said data translator;
   a UTOPIA mapper connected to the UTOPIA switch, for performing as a UTOPIA interface on the data to enable data to be received from and transmitted to the layer converter;
   a layer converter for converting the data from the UTOPIA switch to any one of asynchronous transfer mode adaptation layer 0 data and asynchronous transfer mode adaptation layer 2 data; and
   a controller for controlling operations of said layer converter, said UTOPIA mapper, and said UTOPIA switch.

2. The apparatus as claimed in claim 1, said controller performing an inter process communication with said cell controller.

3. The apparatus as claimed in claim 1, said controller performing an inter process communication with said base station.

4. The apparatus as claimed in claim 1, further comprising an external connection unit being connected to said controller and an external operator device.

5. The apparatus as claimed in claim 1, further comprising a memory unit storing data for use by said controller.

6. The apparatus as claimed in claim 1, said physical layer processor translating to a physical layer data on a data received from said UTOPIA switch and transmitting to said cell controller through said plurality of line interface units.

7. The apparatus as claimed in claim 1, said data translator translating traffic information data received through said base station into a signal for the asynchronous transfer mode adaptation layer 0 data, the translated data being transmitted to said UTOPIA switch for transmission to said layer converter.

8. A data translation apparatus in a mobile communication, the apparatus comprising:
   a physical layer processor performing cell mapping on a data received from a cell controller using asynchronous transfer mode data;
   a universal test and operations physical layer protocol interface for asynchronous transfer mode (UTOPIA) switch connected to the physical layer processor for transmitting data between said cell controller and a base station;
   a data translator for translating data to be transmitted to said UTOPIA switch into asynchronous transfer mode adaptation layer 0 data, and for translating data to be transmitted to said Internet protocol base station into a first data;
   a UTOPIA mapper for performing a as a UTOPIA interface on the data from said UTOPIA switch;
   a layer converter for converting the data from the UTOPIA interface to any one of asynchronous transfer mode adaptation layer 0 data and asynchronous transfer mode adaptation layer 2 data; and
   a controller for controlling operations of said layer converter, said UTOPIA mapper, and said UTOPIA switch.

9. The apparatus of claim 8, said controller performing an inter process communication with said cell controller.

10. The apparatus of claim 8, said controller performing an inter process communication with said base station.

11. The apparatus of claim 8, further comprising an external connection unit being connected to said controller and an external operator device.

12. The apparatus of claim 8, said physical layer processor translating to a physical layer data on a data received from said UTOPIA switch and transmitting to said cell controller.

13. The apparatus of claim 8, said data translator translating traffic information data received through said Internet protocol base station into a signal for the asynchronous transfer mode adaptation layer 0 data, the translated data being transmitted to said UTOPIA switch for transmission to said layer converter.

14. The apparatus of claim 8, the first data being Ethernet data.

* * * * *